(12) United States Patent
Wang et al.

(10) Patent No.: US 12,469,498 B2
(45) Date of Patent: *Nov. 11, 2025

(54) TARGETED VOICE SEPARATION BY SPEAKER CONDITIONED ON SPECTROGRAM MASKING

(71) Applicant: GOOGLE LLC, Mountain View, CA (US)

(72) Inventors: Quan Wang, Hoboken, NJ (US); Prashant Sridhar, New York, NY (US); Ignacio Lopez Moreno, New York, NY (US); Hannah Muckenhim, Martigny (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,833

(22) Filed: Mar. 4, 2024

(65) Prior Publication Data

US 2024/0203426 A1 Jun. 20, 2024

Related U.S. Application Data

(63) Continuation of application No. 17/567,590, filed on Jan. 3, 2022, now Pat. No. 11,922,951, which is a (Continued)

(51) Int. Cl.
*G10L 17/04* (2013.01)
*G10L 17/00* (2013.01)
(Continued)

(52) U.S. Cl.
CPC .............. *G10L 17/04* (2013.01); *G10L 17/00* (2013.01); *G10L 17/02* (2013.01); *G10L 17/18* (2013.01); *G10L 17/22* (2013.01); *G10L 25/18* (2013.01)

(58) Field of Classification Search
None
See application file for complete search history.

(56) References Cited

U.S. PATENT DOCUMENTS 6,502,067 B1 * 12/2002 Hegger ............... G10L 21/0208
704/226
7,243,060 B2 7/2007 Atlas et al.
(Continued)

OTHER PUBLICATIONS

Huang, P. et al., "Deep learning for monaural speech separation," in Acoustics, Speech and Signal Processing (ICASSP), 2014 IEEE International Conference; pp. 1562-1566; 2014.
(Continued)

*Primary Examiner* — Douglas Godbold
(74) *Attorney, Agent, or Firm* — Gray Ice Higdon

(57) ABSTRACT

Techniques are disclosed that enable processing of audio data to generate one or more refined versions of audio data, where each of the refined versions of audio data isolate one or more utterances of a single respective human speaker. Various implementations generate a refined version of audio data that isolates utterance(s) of a single human speaker by processing a spectrogram representation of the audio data (generated by processing the audio data with a frequency transformation) using a mask generated by processing the spectrogram of the audio data and a speaker embedding for the single human speaker using a trained voice filter model. Output generated over the trained voice filter model is processed using an inverse of the frequency transformation to generate the refined audio data.

20 Claims, 9 Drawing Sheets

Related U.S. Application Data continuation of application No. 16/598,172, filed on Oct. 10, 2019, now Pat. No. 11,217,254.

(60) Provisional application No. 62/784,669, filed on Dec. 24, 2018.

(51) Int. Cl.
  G10L 17/02 (2013.01)
  G10L 17/18 (2013.01)
  G10L 17/22 (2013.01)
  G10L 25/18 (2013.01)

(56) References Cited

U.S. PATENT DOCUMENTS

| | | | | |
|---|---|---|---|---|
| 8,682,667 | B2* | 3/2014 | Haughay | G10L 17/08 704/251 |
| 10,522,167 | B1 | 12/2019 | Ayrapetian | |
| 11,217,254 | B2* | 1/2022 | Wang | G10L 17/04 |
| 2011/0188671 | A1 | 8/2011 | Anderson | |
| 2014/0350943 | A1 | 11/2014 | Goldstein | |
| 2015/0025887 | A1* | 1/2015 | Sidi | G10L 17/02 704/245 |
| 2015/0046157 | A1* | 2/2015 | Wolff | G10L 25/51 704/231 |
| 2016/0217792 | A1* | 7/2016 | Gorodetski | G10L 17/04 |
| 2016/0240210 | A1 | 8/2016 | Lou | |
| 2017/0270919 | A1 | 9/2017 | Parthasarathi et al. | |
| 2017/0337924 | A1* | 11/2017 | Yu | G10L 19/022 |
| 2018/0082692 | A1 | 3/2018 | Khoury | |
| 2018/0088899 | A1 | 3/2018 | Gillespie | |
| 2019/0019505 | A1* | 1/2019 | Nicholson | H04L 51/02 |
| 2019/0066713 | A1* | 2/2019 | Mesgarani | G10L 25/30 |
| 2019/0304069 | A1 | 10/2019 | Vogels | |
| 2019/0318754 | A1* | 10/2019 | Le Roux | G10L 19/02 |
| 2020/0013425 | A1 | 1/2020 | Bergmann | |
| 2020/0135209 | A1* | 4/2020 | Delfarah | G10L 17/04 |
| 2020/0227064 | A1* | 7/2020 | Xu | G06N 3/08 |
| 2020/0342857 | A1* | 10/2020 | Moreno | G10L 15/22 |
| 2022/0122611 | A1 | 4/2022 | Wang et al. | |
| 2023/0116052 | A1 | 4/2023 | Emre | |

OTHER PUBLICATIONS

Wang, Y. et al., "On training targets for supervised speech separation," IEEE/ACM Transactions on Audio, Speech and Language Processing (TASLP), vol. 22, No. 12, pp. 1849-1858, 2014.

Du, J. et al., "A regression approach to single-channel speech separation via high-resolution deep neural networks," IEEE/ACM Transactions on Audio, Speech, and Language Processing, vol. 24, No. 8, pp. 1424-1437, 2016.

Chen, Z. et al., "Deep attractor network for single-microphone speaker separation," in Acoustics, Speech and Signal Processing (ICASSP), 2017 IEEE International Conference; pp. 246-250; 2017.

Fu, S. et al., "Raw waveform-based speech enhancement by fully convolutional networks," arXiv preprint arXiv:1703.02205, 7 pages; 2017.

Pascual, S. et al., "Segan: Speech enhancement generative adversarial network," arXiv preprint arXiv:1703.09452, 5 pages; 2017.

Wilson, K. et al., "Exploring tradeoffs in models for low-latency speech enhancement," in International Workshop on Acoustic Signal Enhancement (IWAENC); 5 pages; 2018.

Heigold, G. et al., "End-to-end text-dependent speaker verification," in Acoustics, Speech and Signal Processing (ICASSP); IEEE; pp. 5115-5119; 2016.

Wan, L. et al., "Generalized end-to-end loss for speaker verification," in Acoustics, Speech and Signal Processing (ICASSP); IEEE; 5 pages; 2018.

Zmolikova, K. et al., "Speaker-aware neural network based beamformer for speaker extraction in speech mixtures," in Interspeech; 5 pages; 2017.

Wang, Q. et al., "Speaker diarization with lstm," in Acoustics, Speech and Signal Processing (ICASSP); IEEE; 5 pages; 2018.

Jia, Y. et al., "Transfer learning from speaker verification to multispeaker text-to-speech synthesis," in Conference on Neural Information Processing Systems (NIPS); 11 pages; 2018.

Panayotov, V. et al., "Librispeech: An ASR Corpus Based On Public Domain Audio Books," in Acoustics, Speech and Signal Processing (ICASSP); IEEE International Conference; pp. 5206-5210; dated 2015.

Nagrani, A. et al., "Voxceleb: a large-scale speaker identification dataset," arXiv preprint arXiv:1706.08612; 5 pages; 2017.

Chung, J. et al., "Voxceleb2: Deep speaker recognition," arXiv preprint arXiv:1806.05622; 6 pages; 2018.

Michaely, A. et al., "Unsupervised context learning for speech recognition," in Spoken Language Technology Workshop (SLT); IEEE; pp. 447-453; 2016.

Vincent, E. et al., "Performance measurement in blind audio source separation," IEEE Transactions on Audio, Speech, and Language Processing (TASLP), vol. 14, No. 4, pp. 1462-1469, 2006.

Cherry, E., "Some experiments on the recognition of speech, with one and with two ears," The Journal of the Acoustical Society of America, vol. 25, No. 5, pp. 975-979, 1953.

Yu, D. et al., "Permutation invariant training of deep models for speaker-independent multi-talker speech separation," in Proceedings of International Conference on Acoustics, Speech and Signal Processing (ICASSP); IEEE; pp. 241-245; 2017.

Dehak, N. et al., "Front-end factor analysis for speaker verification;" IEEE Transactions on Audio, Speech, and Language Processing; vol. 19, No. 4; pp. 788-798; 2010.

Wang, J. et al., "Deep extractor network for target speaker recovery from single channel speech mixtures," arXiv preprint arXiv:1807.08974; 5 pages; 2018.

Delcroix, M. et al., "Single channel target speaker extraction and recognition with speaker beam," in 2018 IEEE International Conference on Acoustics, Speech and Signal Processing (ICASSP); IEEE; pp. 5554-5558; 2018.

He, Y. et al., "Streaming end-to-end speech recognition for mobile devices," in International Conference on Acoustics, Speech and Signal Processing (ICASSP); IEEE; pp. 6381-6385; 2019.

Griffin, D. et al., "Signal estimation from modified short-time fourier transform;" IEEE Transactions on Acoustics, Speech, and Signal Processing, vol. 32, No. 2, pp. 236-243, 1984.

Ko, T. et al. "A study on data augmentation of reverberant speech for robust speech recognition," in 2017 IEEE International Conference on Acoustics, Speech and Signal Processing (ICASSP); IEEE; pp. 5220-5224; 2017.

Alvarez, R. et al., "On the efficient representation and execution of deep acoustic models," arXiv preprint arXiv:1607.04683; 5 pages; 2016.

Hershey, J. et al., "Deep clustering: Discriminative embeddings for segmentation and separation," in Acoustics, Speech and Signal Processing (ICASSP), 2016 IEEE International Conference; pp. 31-35; 2016.

Kolbæk, M. et al., "Multitalker speech separation with utterance-level permutation invariant training of deep recurrent neural networks," IEEE/ACM Transactions on Audio, Speech and Language Processing (TASLP), vol. 25, No. 10, pp. 1901-1913, 2017.

Wang, Q. et al., "Voicefilter: Targeted voice separation by speaker-conditioned spectrogram masking," arXiv preprint arXiv:1810.04826; 5 pages; 2018.

Xiao, X. et al., "Single-Channel Speech Extraction Using Speaker Inventory and Attention Network;" International Conference on Acoustics, Speech and Signal Processing (ICASSP), IEEE; pp. 86-90; May 12, 2019 May 12, 2019.

Hetherly, J. et al., "Deep Speech Denoising with Vector Space Projections;" Cornell University; arXiv.org; arXiv:1804.10869v1; 5 pages; Apr. 27, 2018 Apr. 27, 2018.

European Patent Office; International Search Report and Written Opinion of PCT application Ser. No. PCT/US2019/055539; 12 pages; dated May 8, 2020.

* cited by examiner

TARGETED VOICE SEPARATION BY SPEAKER CONDITIONED ON SPECTROGRAM MASKING

BACKGROUND

An automated assistant (also known as a "personal assistant", "mobile assistant", etc.) may be interacted with by a user via a variety of client devices such as smart phones, tablet computers, wearable devices, automobile systems, standalone personal assistant devices, and so forth. An automated assistant receives input from the user including spoken natural language input (i.e., utterances) and may respond by performing an action, by controlling another device and/or providing responsive content (e.g., visual and/or audible natural language output). An automated assistant interacted with via a client device may be implemented via the client device itself and/or via one or more remote computing devices that are in network communication with the client device (e.g., computing device(s) in the cloud).

An automated assistant can convert audio data, corresponding to a spoken utterance of a user, into corresponding text (or other semantic representation). For example, audio data can be generated based on the detection of a spoken utterance of a user via one or more microphones of a client device that includes the automated assistant. The automated assistant can include a speech recognition engine that attempts to recognize various characteristics of the spoken utterance captured in the audio data, such as the sounds produced (e.g., phonemes) by the spoken utterance, the order of the pronounced sounds, rhythm of speech, intonation, etc. Further, the speech recognition engine can identify text words or phrases represented by such characteristics. The text can then be further processed by the automated assistant (e.g., using a natural language understanding engine and/or a dialog state engine) in determining responsive content for the spoken utterance. The speech recognition engine can be implemented by the client device and/or by one or more automated assistant component(s) that are remote from, but in network communication with, the client device.

SUMMARY

Techniques described herein are directed to isolating a human voice from an audio signal by generating a predicted mask using a trained voice filter model, where processing the audio signal with the predicted mask can isolate the human voice. For example, assume a sequence of audio data that includes first utterance(s) from a first human speaker, second utterance(s) from a second human speaker, and various occurrences of background noise. Implementations disclosed herein can be utilized to generate refined audio data that includes only the utterance(s) from the first human speaker, and excludes the second utterance(s) and the background noise.

Spectrograms are representations of the frequencies of sounds in audio data as they vary over time. For example, a spectrogram representation of audio data can be generated by processing the audio data using a frequency transformation such as a Fourier transform. In other words, processing an audio signal using a frequency transformation such as a Fourier transform (e.g., a short-time Fourier transform) can generate a frequency domain representation of the audio data. Similarly, spectrograms (i.e., frequency domain representations) can be processed using an inverse of the frequency transformation such as an inverse Fourier transform (e.g., an inverse short-time Fourier transform), to generate a time domain representation of the spectrogram (i.e., audio data).

Various implementations generate a refined version of the audio data that isolates utterance(s) of a single human speaker by generating a predicted mask for an audio spectrogram by processing the audio spectrogram and a speaker embedding for the single human using a trained voice filter model. The spectrogram can be processed using the predicted mask, for example, by convolving the spectrogram with the predicted mask, to generate a masked spectrogram in which utterance(s) of the single human speaker have been isolated. The refined version of the audio data is generated by processing the masked spectrogram using the inverse of the frequency transformation.

In generating the speaker embedding for a single human speaker, one or more instances of speaker audio data, corresponding to the human speaker, can be processed using a trained speaker embedding model to generate one or more respective instances of output. The speaker embedding can then be generated based on the one or more respective instances of output. The trained speaker embedding model can be a machine learning model, such as a recurrent neural network (RNN) model that includes one or more memory layers what each include one or more memory units. In some implementations, a memory unit can be a long short-term memory (LSTM) unit. In some implementations, additional or alternative memory unit(s) may be utilized such as a gated recurrent unit (GRU).

As one example of generating a speaker embedding for a given speaker, the speaker embedding can be generated during an enrollment process in which the given speaker speaks multiple utterances. In many implementations that utilize a speaker embedding for a given speaker that is pre-generated (e.g., during an enrollment process), techniques described herein can utilize the pre-generated speaker embedding in generating refined versions of audio data that isolate utterance(s) of the given speaker, where the audio data is received from the user via a client device and/or a digital system (e.g., an automated assistant) associated with the enrollment process. For example, if audio data is received via a client device of the given user and/or is received after verification of the given user (e.g., using voice fingerprinting from earlier utterance(s) and/or other biometric verification(s)), the speaker embedding for the given user can be utilized to generate a refined version of the audio data in real-time. Such a refined version can be utilized for various purposes, such as voice-to-text conversion of the refined audio data, verifying that segment(s) of the audio data are from the use, and or other purpose(s) described herein.

In some additional or alternative implementations, a speaker embedding utilized in generating a refined version of audio data can be based on one or more instances of the audio data (to be refined) itself. For example, a voice activity detector (VAD) can be utilized to determine a first instance of voice activity in the audio data, and portion(s) of the first instance can be utilized in generating a first speaker embedding for a first human speaker. For example, the first speaker embedding can be generated based on processing, using the speaker embedding model, features of the first X (e.g., 0.5, 1.0, 1.5, 2.0) second(s) of the first instance of voice activity (the first instance of voice activity can be assumed to be from a single speaker). The first speaker embedding can then be utilized to generate a first refined version of the audio data that isolates utterance(s) of the first speaker as described herein. In some of those implementations, the first refined version of the audio data can be utilized to determine those segment(s) of the audio data that correspond to utterance(s) of the first speaker and the VAD can be utilized to determine an additional instance (if any) of voice activity in the audio data that occurs outside of those segment(s). If an additional instance is determined, a second speaker embedding can be generated for a second human speaker, based on processing portion(s) of the additional instance using the speaker embedding model. The second speaker embedding can then be utilized to generate a second refined version of the audio data that isolate(s) utterance(s) of the second speaker as described herein. This process can continue until, for example, no further utterance attributable to an additional human speaker is identified in the audio data. Accordingly, in these implementations speaker embeddings utilized in generating refined version(s) of audio data can be generated form the audio data itself.

Regardless of the technique(s) utilized to generate a speaker embedding, implementations disclosed herein process spectrogram representations of audio data and the speaker embedding, using a trained voice filter model, to generate a predicted mask which can be used in isolating utterance(s) (if any) of a speaker corresponding to the speaker embedding. Voice filter models can include a variety of layers including: a convolutional neural network portion, a recurrent neural network portion, as well as a fully connected feed-forward neural network portion. A spectrogram of the audio data can be processed using the convolutional neural network portion to generate convolutional output. Additionally or alternatively, the convolutional output and a speaker embedding associated with the human speaker can be processed using the recurrent neural network portion to generate recurrent output. In many implementations, the recurrent output can be processed using the fully connected feed-forward neural network portion to generate a predicted mask. The spectrogram can be processed using the predicted mask, for example by convolving the spectrogram with the predicted mask, to generate a masked spectrogram. The masked spectrogram includes only the utterance(s) associated with the human speaker and excludes any background noise and/or additional human speaker(s) in the audio data. In many implementations, the masked spectrogram can be processed using an inverse transformation such as an inverse Fourier transform to generate the refined version of the audio data.

Utilizing the trained voice filter model to process given audio data in view of a given speaker embedding, will result in refined audio data that is the same as the given audio data when the given audio data includes only utterance(s) form the given speaker. Further, it will result in refined audio data that is null/zero when the given audio data lacks any utterances from the given speaker. Yet further, it result in refined audio that excludes additional sound(s), while isolating utterance(s) from the given speaker, when the given audio data includes utterance(s) from the given speaker and additional sound(s) (e.g., overlapping and/or non-overlapping utterance(s) of other human speaker(s)).

Refined version(s) of audio data can be utilized by various components and for various purposes. As one example, voice-to-text processing can be performed on a refined version of audio data that isolates utterance(s) from a single human speaker. Performing the voice-to-text processing on the refined version of the audio data can improve accuracy of the voice-to-text processing relative to performing the processing on the audio data (or alternatively pre-processed version of the audio data) due to, for example, the refined version lacking background noise, utterance(s) of other user(s) (e.g., overlapping utterances), etc. Moreover, performing voice-to-text processing on the refined version of the audio data ensures that resulting text belongs to a single speaker. The improved accuracy and/or ensuring that resulting text belongs to a single speaker can directly result in further technical advantages. For example, the improved accuracy of text can increase the accuracy of one or more downstream components that rely on the resulting text (e.g., natural language processor(s), module(s) that generate a response based on intent(s) and parameter(s) determined based on natural language processing of the text). Also, for example, when implemented in combination with an automated assistant and/or other interactive dialog system, the improved accuracy of text can lessen the chance that the interactive dialog system will incorrectly convert the spoken utterance to text, thereby leading to provision of an erroneous response to the utterance by the dialog system. This can lessen a quantity of dialog turns that would otherwise be needed for a user to again provide the spoken utterance and/or other clarification(s) to the interactive dialog system.

The above description is provided only as an overview of some implementations disclosed herein. These and other implementations of the technology are disclosed in additional detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
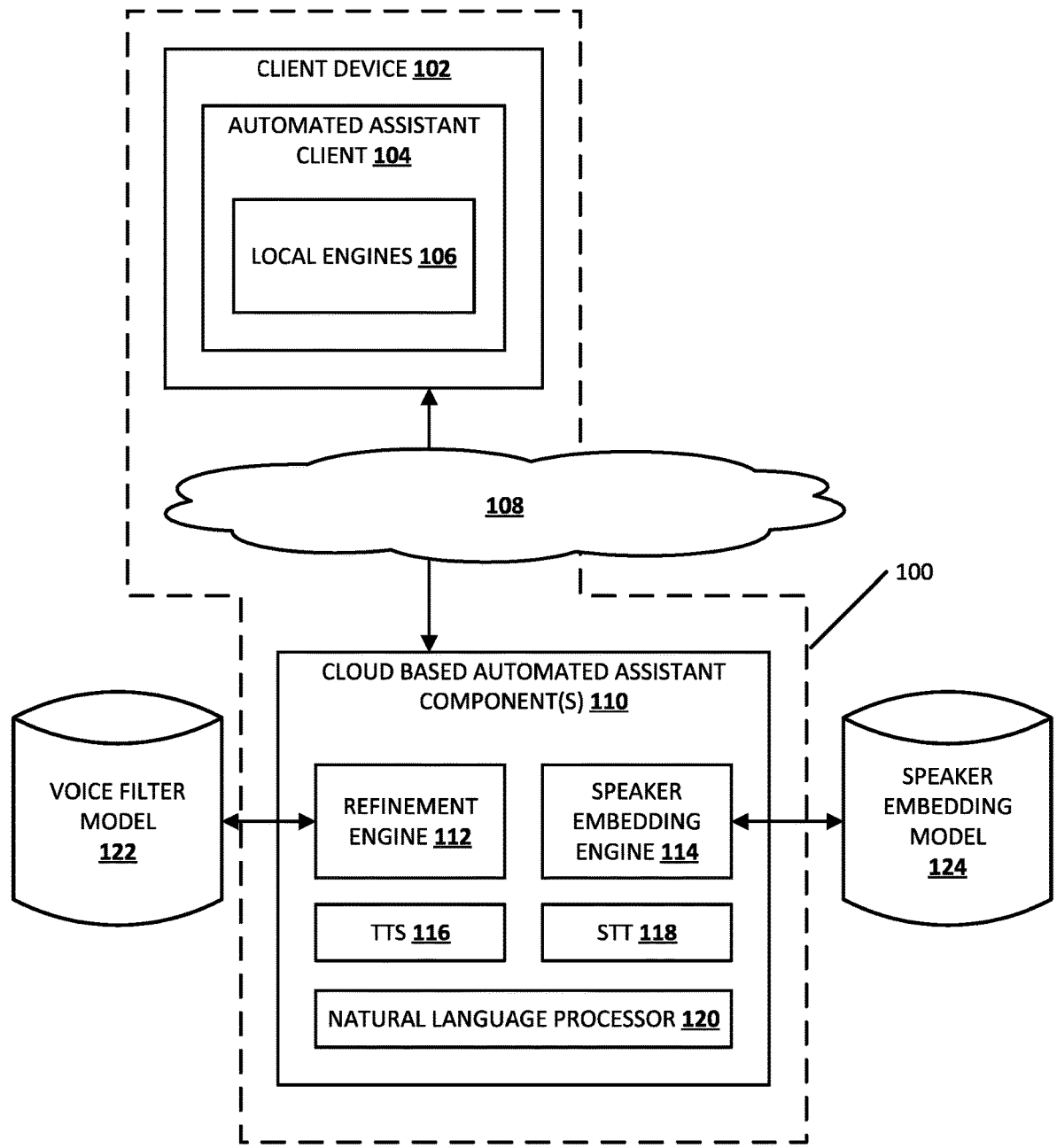
FIG. 1 illustrates a block diagram of an example environment where various implementations disclosed herein can be implemented.

Turning initially to FIG. 1, an example environment is illustrated where various implementations can be performed.

FIG. 1 includes a client computing device 102, which executes an instance of automated assistant client 104. One or more cloud-based automated assistant components 110 can be implemented on one or more computing systems (collectively referred to as cloud computing systems) that are communicatively coupled to client device 102 via one or more local and/or wide area networks (e.g., the Internet) indicated generally as 108.

An instance of an automated assistant client 104, by way of its interactions with one or more cloud-based automated assistant components 110, may form what appears to be, from the user's perspective, a logical instance of an automated assistant 100 with which the user may engage in a human-to-computer dialog. It should be understood that in some implementations, a user that engages with an automated assistant client 104 executing on client device 102 may, in effect, engage with his or her own logical instance of an automated assistant 100. For the sakes of brevity and simplicity, the term "automated assistant" as used herein as "serving" a particular user will often refer to the combination of an automated assistant client 104 executing on a client device 102 operated by the user and one or more cloud-based automated assistant components 110 (which may be shared amongst multiple automated assistant clients of multiple client computing devices).

The client computing device 102 may be, for example: a desktop computing device, a laptop computing device, a tablet computing device, a mobile phone computing device, a computing device of a vehicle of the user (e.g., an in-vehicle communications system, and in-vehicle entertainment system, an in-vehicle navigation system), a standalone interactive speaker, a smart appliance such as a smart television, and/or a wearable apparatus of a user that includes a computing device (e.g., a watch of the user having a computing device, glasses of the user having a computing device, a virtual or augmented reality computing device). Additional and/or alternative client computing devices may be provided. In various implementations, the client computing device 102 may optionally operate one or more other applications that are in addition to automated assistant client 104, such as a message exchange client (e.g., SMS, MMS, online chat), a browser, and so forth. In some of those various implementations, one or more of the other applications can optionally interface (e.g., via an application program interface) with the automated assistant 100, or include their own instance of an automated assistant application (that may also interface with the cloud-based automated assistant component(s) 110).

Automated assistant 100 engages in human-to-computer dialog sessions with a user via user interface input and output devices of the client device 102. To preserve user privacy and/or conserver resources, in many situations a user must often explicitly invoke the automated assistant 100 before the automated assistant will fully process a spoken utterance. The explicit invocation of the automated assistant 100 can occur in response to certain user interface input received at the client device 102. For example, user interface inputs that can invoke the automated assistant 100 via the client device 102 can optionally include actuations of a hardware and/or virtual button of the client device 102. Moreover, the automated assistant client can include one or more local engines 106, such as an invocation engine that is operable to detect the presence of one or more spoken invocation phrases. The invocation engine can invoke the automated assistant 100 in response to detection of one of the spoke invocation phrases. For example, the invocation engine can invoke the automated assistant 100 in response to detecting a spoken invocation phrase such as "Hey Assistant", "OK Assistant", and/or "Assistant". The invocation engine can continuously process (e.g., if not in an inactive mode) a stream of audio data frames that are based on output from one or more microphones of the client device 102, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 100. As used herein, "invoking" the automated assistant 100 can include causing one or more previously inactive functions of the automated assistant 100 to be activated. For example, invoking the automated assistant 100 can include causing one or more local engines 106 and/or cloud-based automated assistant components 110 to further process audio data frames based on which the invocation phrase was detected, and/or one or more following audio data frames (whereas prior to invoking no further processing of audio data frames was occurring). For instance, local and/or cloud-based components can generate refined version of audio data and/or perform other processing in response to invocation of the automated assistant 100. In some implementations, the spoken invocation phrase can be processed to generate a speaker embedding that is used in generating a refined version of audio data that follows the spoken invocation phrase. In some implementations, the spoken invocation phrase can be processed to identify an account associated with a speaker of the spoken invocation phrase, and a stored speaker embedding associated with the account utilized in generating a refined version of audio data that follows the spoken invocation phrase.

The one or more local engine(s) 106 of automated assistant 100 are optional, and can include, for example, the invocation engine described above, a local speech-to-text ("STT") engine (that converts captured audio to text), a local text-to-speech ("TTS") engine (that converts text to speech), a local natural language processor (that determines semantic meaning of audio and/or text converted from audio), and/or other local components. Because the client device 102 is relatively constrained in terms of computing resources (e.g., processor cycles, memory, battery, etc.), the local engines 106 may have limited functionality relative to any counterparts that are included in cloud-based automated assistant components 110.

Cloud-based automated assistant components 110 leverage the virtually limitless resources of the could to perform more robust and/or more accurate processing of audio data, and/or other user interface input, relative to any counterparts of the local engine(s) 106. Again, in various implementations, the client device 102 can provide audio data and/or other data to the could-based automated assistant components 110 in response to the invocation engine detecting a spoken invocation phrase, or detecting some other explicit invocation of the automated assistant 100.

The illustrated cloud-based automated assistant components 110 include a cloud-based TTS module 116, a cloud-based STT module 118, and a natural language processor 120. The illustrated cloud-based automated assistant components 110 also include refinement engine 112 that utilizes voice filter model 122 in generating refined version(s) of audio data, and that can provide the refined version(s) to one or more other cloud-based automated assistant components 110 (e.g., STT module 118, natural language processor 120, etc.). Further, the cloud-based automated assistant components 110 include the speaker embedding engine 114 that utilizes the speaker embedding model 124 for various proposes described herein.

In some implementations, one or more of the engines and/or modules of automated assistant 100 may be omitted, combined, and/or implemented in a component that is separate from automated assistant 100. For example, in some implementations, the refinement engine 112, the voice filter model 122, the speaker embedding engine 114, and/or the speaker embedding model 124 can be implemented, in whole or in part, on the client device 102. Further, in some implementations automated assistant 100 can include additional and/or alternative engines and/or modules.

Cloud based STT module 118 can convert audio data into text, which may then be provided to natural language processor 120. In various implementations, the cloud-based STT module 118 can convert audio data into text based at least in part on refined version(s) of audio data that are provided by the refinement engine 112.

Cloud-based TTS module 116 can convert textual data (e.g., natural language responses formulated by automated assistant 100) into computer-generated speech output. In some implementations, TTS module 116 may provide the computer-generated speech output to client device 102 to be output directly, e.g., using one or more speakers. In other implementations, textual data (e.g., natural language responses) generated by cloud-based automated assistant component(s) 110 may be provided to one or the local engine(s) 106, which may then convert the textual data into computer-generated speech that is output locally.

Natural language processor 120 of automated assistant 100 processes free form natural language input and generates, based on the natural language input, annotated output for use by one or more other components of the automated assistant 100. For example, the natural language processor 120 can process natural language free-form input that is textual input that is a conversion, by STT module 118, of audio data provided by a user via client device 102. The generated annotated output may include one or more annotations of the natural language input and optional one or more (e.g., all) of the terms of the natural language input.

In some implementations, the natural language processor 120 is configured to identify and annotate various types of grammatical information in natural language input. In some implementations, the natural language processor 120 may additionally and/or alternatively include an entity tagger (not depicted) to configure to annotate entity references in one or more segments such as references to people (including, for instance, literary characters, celebrities, public figures, etc.), organizations, locations (real and imaginary), and so forth. In some implementations, the natural language processor 120 may additionally and/or alternatively include a coreference resolver (not depicted) configure to group, or cluster, references to the same entity based on one or more contextual cues. For example, the coreference resolver may be utilized to resolve the term "there" to "Hypothetical Café" in the natural language input "I liked Hypothetical Café last time we ate there". In some implementations, one or more components of the natural language processor 120 may rely on annotations from one or more other components of the natural language processor 120. In some implementations, in processing a particular natural langue input, one or more components of the natural language processor 1020 may use related prior input and/or other related data outside of the particular natural language input to determine one or more annotations.

In some implementations, cloud-based automated assistant components 110 can include a dialog state tracker (not depicted) that may be configured to keep track of a "dialog state" that includes, for instance, a belief state of a one or more users' goals (or "intents") over the course of a human-to-computer dialog session and/or across multiple dialog sessions. In determining a dialog state, some dialog state trackers may seek to determine, based on user and system utterances in a dialog session, the most likely value(s) for slot(s) that are instantiated in the dialog. Some techniques utilized a fixed ontology that defines a set of slots and the set of values associated with those slots. Some techniques additionally or alternatively may be tailored to individual slots and/or domains. For example, some techniques may require training a model for each slot type in each domain.

Cloud-based automated assistant components 110 can include a dialog manager (not depicted) which may be configured to map a current dialog state, e.g., provided by a dialog state tracker, to one or more "responsive actions" of a plurality of candidate responsive actions that are then performed by automated assistant 100. Responsive actions may come in a variety of forms, depending on the current dialog state. For example, initial and midstream dialog states that correspond to turns of a dialog session that occur prior to a last turn (e.g., when the ultimate user-desired task is performed) may be mapped to various responsive actions that include automated assistant 100 outputting additional natural language dialog. This responsive dialog may include, for instance, requests that the user provide parameters for some action (i.e., fill slots) that a dialog state tracker believes the user intends to perform. In some implementations, responsive actions may include actions such as "requests" (e.g., seek parameters for slot filling), "offer" (e.g., suggest an action or course of action for the user), "select", "inform" (e.g., provide the user with requested information), "no match" (e.g., notify the user that the user's last input is not understood), a command to a peripheral device (e.g., to turn off a light bulb), and so forth.

Figure 2:
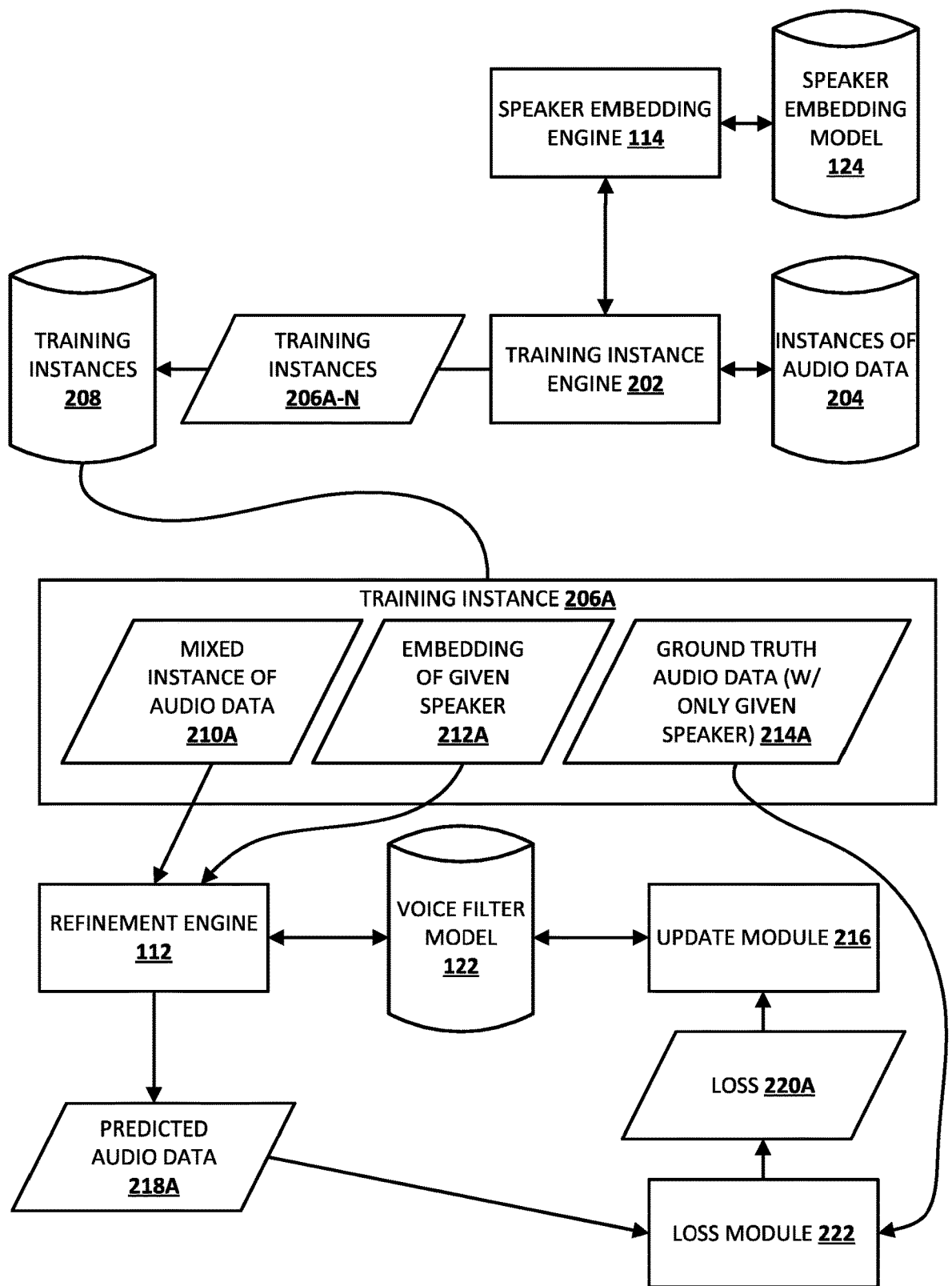
FIG. 2 illustrates an example of training a voice filter model according to various implementations disclosed herein.

Turning to FIG. 2, an example of training a voice filter model 122 is illustrated. The voice filter model 122 can be a neural network model and can include a convolutional neural network portion, a recurrent neural network portion, a fully connected feed forward neural network portion, and/or additional neural network layers. The voice filter model 122 is trained to be used to generate, based on processing a frequency domain representation of audio data (i.e., a spectrogram) and a speaker embedding of a target human speaker, a spectrogram representation of a refined version of the audio data that isolates utterance(s) (if any) of the target speaker. As described herein, the voice filter model 122 can be trained to accept as input, an audio spectrogram representation of the audio data (i.e., a spectrogram generated by processing the audio data with a frequency transformation. As further described herein, the output is also generated using the speaker embedding of the target speaker. For example, the speaker embedding of the target speaker can be applied as input to one or more portions of the voice filter model. Accordingly, voice filter model 122, once trained, can be used to generate, as output of the voice filter model 122, a predicted mask which can be convolved with the audio spectrogram to generate a masked spectrogram. An inverse frequency transformation can be applied to the masked spectrogram (e.g., an inverse Fourier transform) to generate predicted audio data (i.e., refined audio data).

Also illustrated is an training instance engine 202 that generates a plurality of training instances 206A-N, that are stored in training instances database 208 for use in training the voice filter model 122. Training instance 206A is illustrated in detail in FIG. 2. The training instance 206A includes a mixed instance of audio data 210A, an embedding of a given speaker 212A, and ground truth audio data 210A that is an instance of audio data with only utterance(s) from the given speaker corresponding to the embedding 212A.

The training instance engine 202 can generate the training instances 206A-N based on instances of audio data from instances of audio data database 204, and through interaction with speaker embedding engine 114. For example, the training instance engine 202 can retrieve the ground truth audio data 214A from the instances of audio data database 204—and use it as the ground truth audio data for the training instance 206A.

Further, the training instance engine 202 can provide the ground truth audio data 212A to the speaker embedding engine 114 to receive, from the speaker embedding engine 114, the embedding of the given speaker 212A. The speaker embedding engine 114 can process one or more segments of the ground truth audio data 214A using the speaker embedding model 124 to generate the embedding of the given speaker 212A. For example, the speaker embedding engine 114 can utilize a voice activity detector (VAD) to determine one or more segments of the ground truth audio data 214A that include voice activity, and determine the embedding of the given speaker 212A based on processing one or more of those segments using the speaker embedding model 124. For instance, all of the segments can be processed using the speaker embedding model 124, and the resulting final output generated based on the processing can be used as the embedding of the given speaker 212A. Also, for instance, a first segment can be processed using the speaker embedding model 124 to generate a first output, a second segment can be processed using the speaker embedding model 124 to generate a second output, etc.—and a centroid of the outputs utilized as the embedding of the given speaker 212A.

The training instance engine 202 generates the mixed instance of audio data 210 by combining the ground truth audio data 214A with an additional instance of audio data from the instances of audio data database 204. For example, the additional instance of audio data can be one that includes one or more other human speaker(s) and/or background noise.

In training the voice filter model 122 based on the training instance 206A, the refinement engine 122 applies a frequency representation of the mixed instance of audio data 201A (i.e., a spectrogram generated by processing the mixed instance of audio data with a frequency transformation) as input to the CNN portion of the voice filter model to generate CNN output. Additionally or alternatively, refinement engine 112 applies the embedding of the given speaker 212A as well as the CNN output as input to the RNN portion of voice filter model 122 to generate RNN output. Furthermore, the refinement engine 112 applies the RNN output as input to a fully connected feed-forward portion of voice filter model 122 to generate a predicted mask, which refinement engine 112 can utilize in processing the spectrogram representation of the mixed instance of audio data to generate a masked spectrogram that isolates utterance(s) of the human speaker. In many implementations, refinement engine 112 generates the refined audio data by processing the masked spectrogram with an inverse of the frequency transformation.

The loss module 222 generates a loss 220A as a function of: the masked spectrogram (i.e., a frequency representation of the refined audio data) and a spectrogram representation of ground truth audio data 214A (which is referred to herein as a "clean spectrogram"). The loss 220A is provided to update module 216, which updates voice filter model 122 based on the loss. For example, the update module 216 can update one or more weights of the voice filter model using backpropagation (e.g., gradient descent).

While FIG. 2 only illustrates a single training instance 206A in detail, it is understood that training instances database 208 can include a large quantity of additional training instances. The additional training instances can include training instances of various lengths (e.g., based on various durations of audio data), training instances with various ground truth audio data and speaker embeddings, and training instances with various additional sounds in the respective mixed instances of audio data. Moreover, it is understood that a large quantity of the additional training instances will be utilized to train voice filter model 122.

Figure 3:
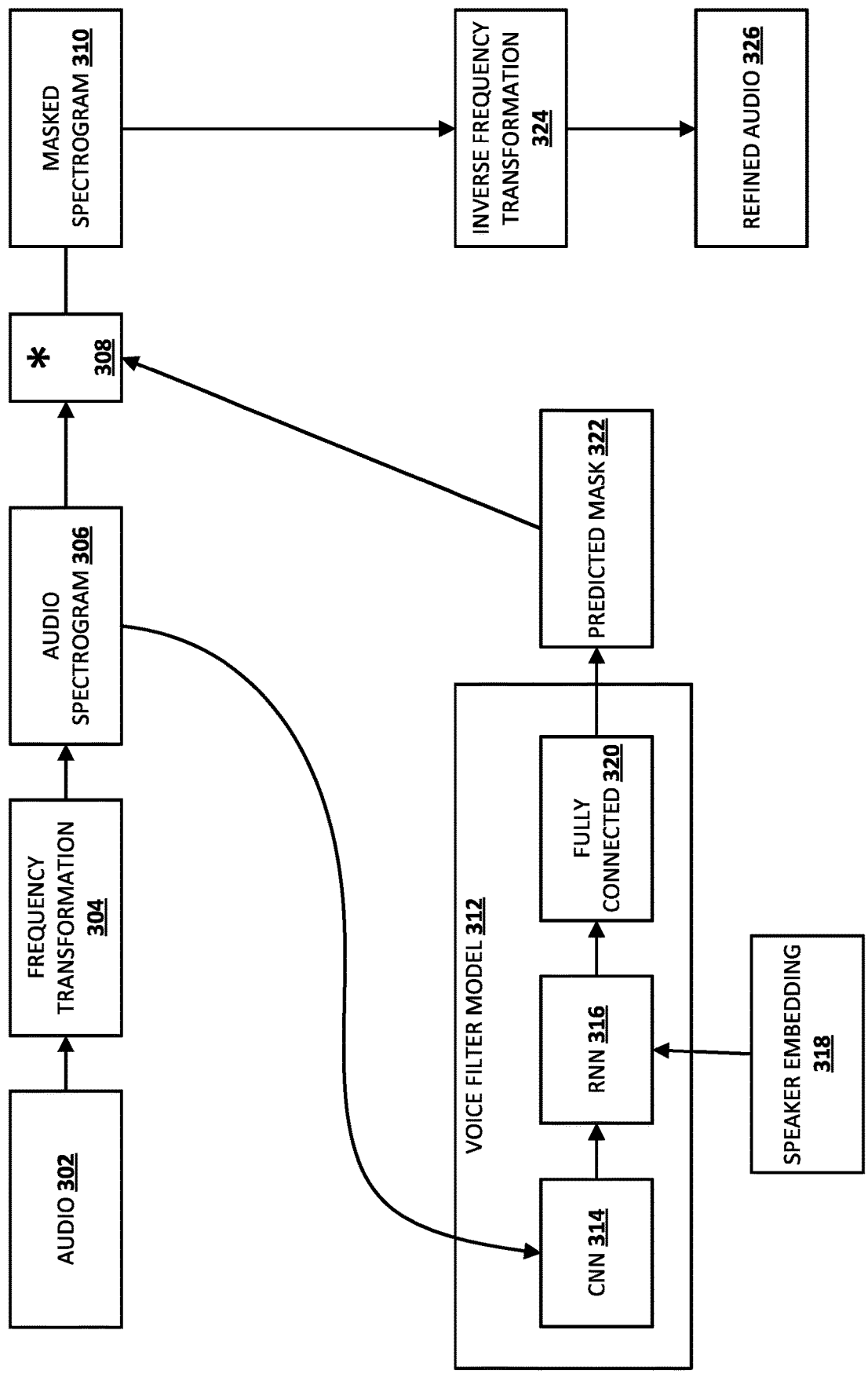
FIG. 3 illustrates an example of generating a refined version of the audio data, using the audio data, a speaker embedding, and a voice filter model.

FIG. 3 illustrates an example of generating a refined version of audio data using audio data, a speaker embedding, and a voice filter model. The voice filter model 312 can be the same as voice filter model 122 of FIG. 1, but has been trained (e.g., utilizing process 600 of FIG. 6 as described herein).

In FIG. 3, the refinement engine (not illustrated) can receive a sequence of audio data 302. The audio data 302 can be, for example, streaming audio data that is processed in an online manner (e.g., in real-time or in near real-time) or non-streaming audio data that has been previously recorded and provided to the refinement engine. The refinement engine also receives a speaker embedding 318 form a speaker embedding engine (not illustrated). The speaker embedding 318 is an embedding for a given human speaker, and can be generated based on processing one or more instances of audio data, from the given speaker, using a speaker embedding model. As described herein, in some implementations, the speaker embedding 318 is previously generated by a speaker embedding engine based on previous instance(s) of audio data from the given speaker. In some of those implementations, the speaker embedding 318 is associated with an account of the given speaker and/or a client device of the given speaker, and the speaker embedding 318 can be provided for utilization with the audio data 302 based on the audio data 302 coming from the client device and/or the digital system where the account has been authorized. As also as described herein, in some implementations, the speaker embedding 318 is generated by a speaker embedding engine based on the audio data 302 itself. For example, VAD can be performed on the audio data 302 to determine a first instance of voice activity in the audio data, and portion(s) of the first instance can be utilized by a speaker embedding engine in generating the speaker embedding.

A refinement engine can be utilized in generating an audio spectrogram 306 by processing the audio data 302 using a frequency transformation 304 (e.g., a Fourier transform). Audio spectrogram 306 can be applied as input to a convolutional neural network (CNN) portion 314 of voice filter model 312. In many implementations, convolutional output generated by the CNN portion 314, as well as speaker embedding 318, can be applied as input to a recurrent neural network (RNN) portion 316 of voice filter model 312. Additionally or alternatively, RNN output generated by the RNN portion 316 can be applied as input to a fully connected feed-forward neural network portion 320 of voice filter model 312 to generate predicted mask 322.

Audio spectrogram 306 can be processed with predicted mask 322 to generate masked spectrogram 310. For example, audio spectrogram 306 can be convolved 308 with predicted mask 322 to generate masked spectrogram 310. In many implementations, refined audio 326 can be generated by processing masked spectrogram 310 using an inverse frequency transformation 324. For example, inverse frequency transformation 324 can be an inverse Fourier transform. The refined audio data 326 can: be the same as audio data 302 when the audio data 302 includes only utterance(s) from the speaker corresponding to the speaker embedding 318; be null/zero when the audio data 302 lacks any utterances from the speaker corresponding to the speaker embedding 318; or exclude additional sound(s) while isolating utterance(s) from the speaker embedding 318, when the audio data 302 includes utterance(s) from the speaker and additional sound(s) (e.g., overlapping utterance(s) of other human speaker(s)).

The refined audio 326 can be provided to one or more additional components by a refinement engine. Although FIG. 3 illustrates generating a single instance of refined audio data 326 based on a single speaker embedding 318, it is understood that in various implementations, multiple instances of refined audio data can be generated, with each instance being based on audio data 303 and a unique speaker embedding for a unique human speaker. In some implementations, the additional component(s) can include a client device or other computing device (e.g., a server device) and the audio data 302 is received as part of a speech processing request submitted by the computing device (or related computing device(s)). In those implementations, the refined audio data 326 is generated in response to receiving the speech processing request, and is transmitted to the computing device in response to receiving the speech processing request. Optionally, other (unillustrated) speech processing can additionally be performed in response to the speech processing request (e.g., voice-to-text processing, natural language understanding, etc.), and the results of such speech processing additionally or alternatively be transmitted in response to the request.

In some implementations, additional component(s) include one or more components of an automated assistant, such as an automated speech recognition (ASR) component (e.g., that performs voice-to-text conversion) and/or a natural language understanding component. For example, the audio data 302 can be streaming audio data that is based on output from one or more microphones of a client device that includes an automated assistant interface for interfacing with the automated assistant. The automated assistant can include (or be in communication with) a refinement engine, and transmitting the refined audio data 326 can include transmitting it to one or more other components of the automated assistant.

Figure 4:
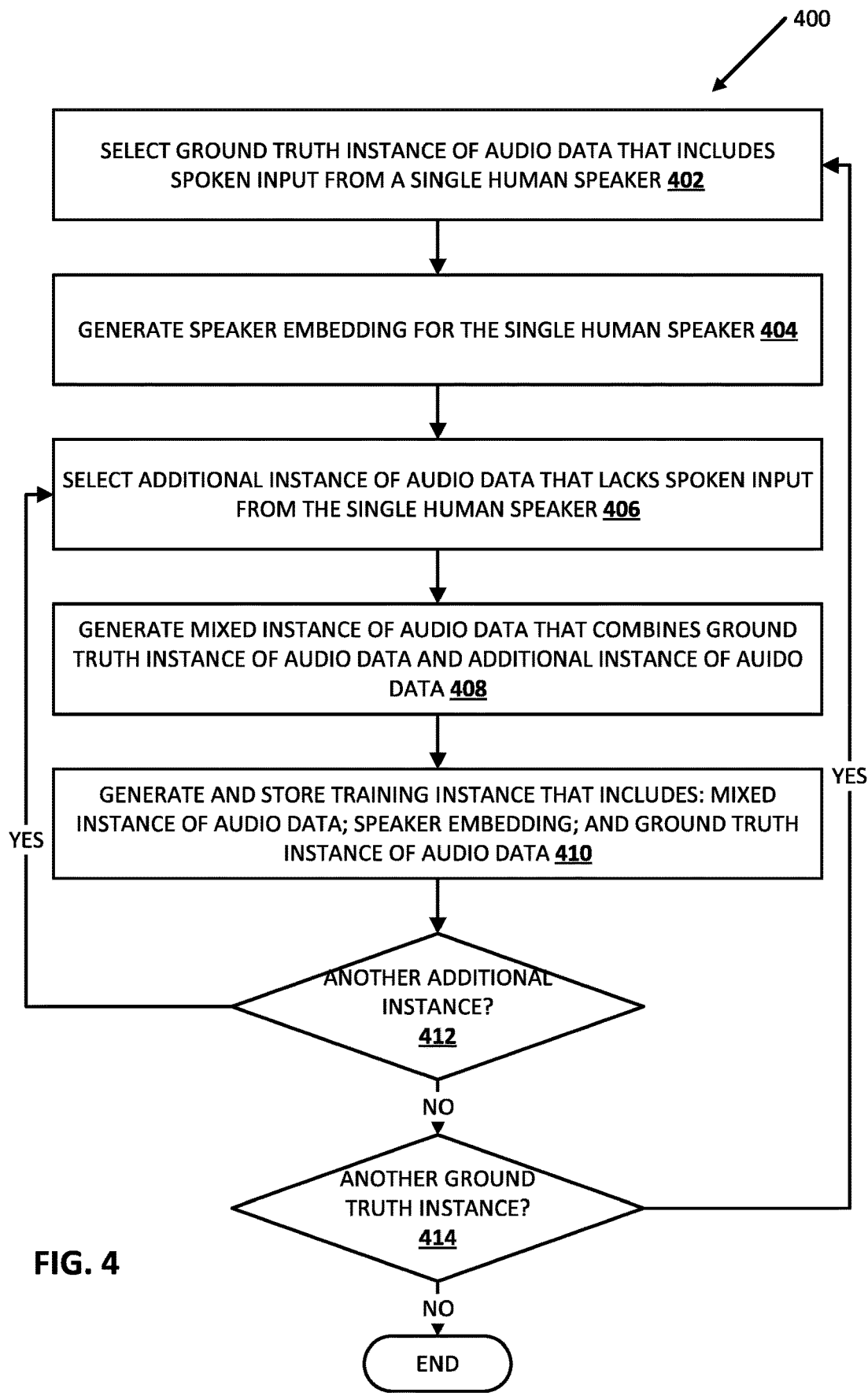
FIG. 4 is a flowchart illustrating an example process of generating training instances, for training a voice filter model, according to various implementations disclosed herein.
Figure 5:
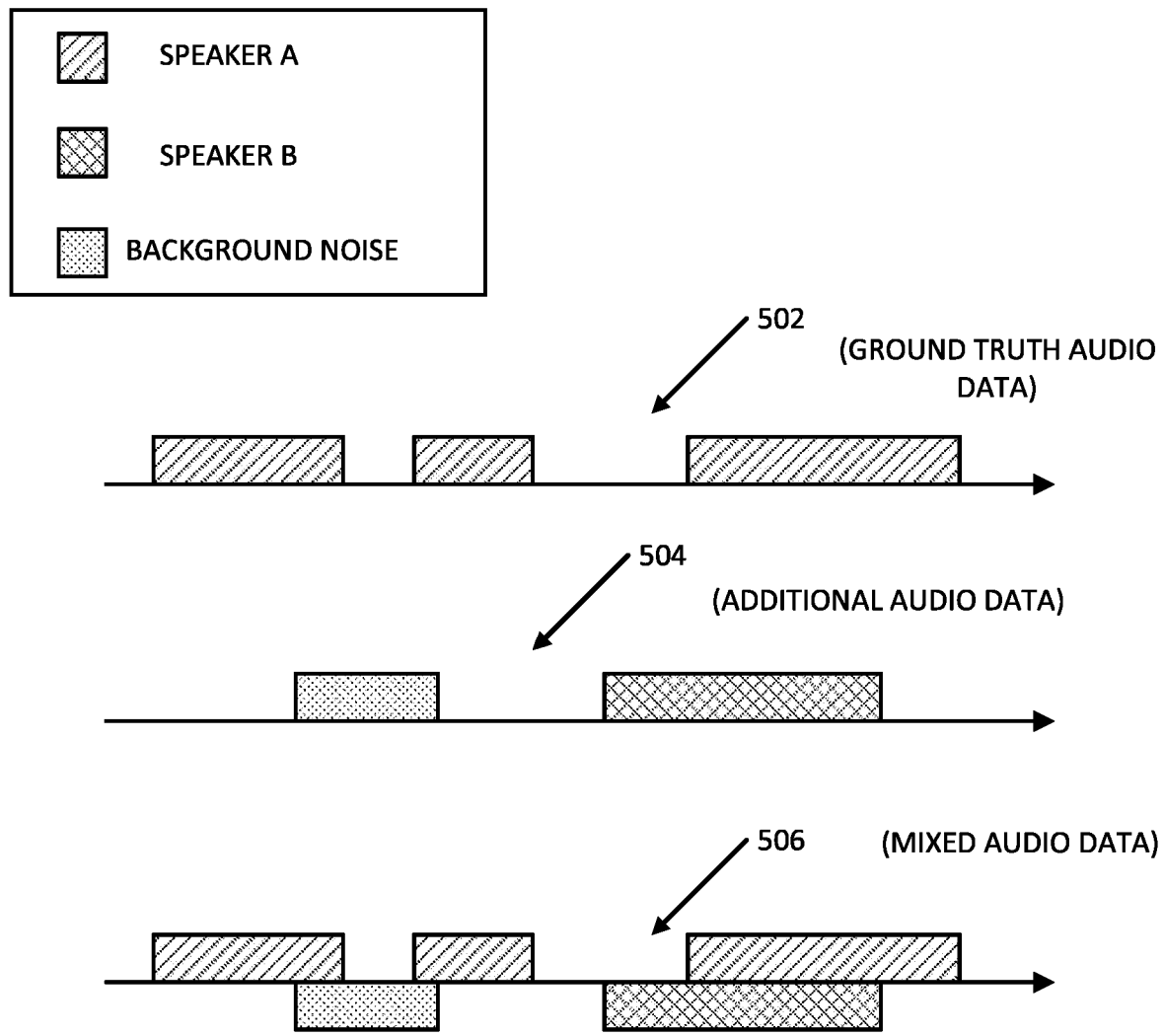
FIG. 5 illustrates examples of using ground truth audio data and additional audio data to generate mixed audio data for use in training instances use to train the voice filter model of FIG. 4.

Turning now to FIG. 4, an example process 400 is illustrated of generating training instances for training a voice filter model according to implementations disclosed herein. For convenience, the operations of certain aspects of the flowchart of FIG. 4 are described with reference to ground truth audio data 502, additional audio data 504, and mixed audio data 506 that are schematically represented in FIG. 5. Also, for convenience, the operations of the flowchart are described with reference to a system that performs the operations. This system may include various components of various computer systems, such as training instance engine 202 and/or one or more of GPU(s), CPU(s), and/or TPU(s). Moreover, while operations of process 400 are shown in a particular order, this is not meant to be limiting. One or more operations may be reordered, omitted, and/or added.

At block 402, the system selects a ground truth instance of audio data that includes spoken input from a single human speaker. For example, the system can select ground truth audio data 502 of FIG. 5. In FIG. 5, the arrow illustrates time and the three diagonal shading areas in the ground truth audio data 502 represent segments of the audio data where "Speaker A" is providing a respective utterance. Notably, the ground truth audio data 502 includes no (or de minimis) additional sounds.

At block 404, the system generates a speaker embedding for the single human speaker. For example, the speaker embedding can be generated by processing one or more segments of the ground truth instance of audio data 502 of FIG. 5, using a speaker embedding model.

At block 406, the system selects an additional instance of audio data that lack spoken input from the single human speaker. The additional instance of audio data can include spoken input from other speaker(s) and/or background noise (e.g., music, sirens, air conditioning noise, etc.). For example, the system can select additional instance of audio data 504 schematically illustrated in FIG. 5 which includes an utterance from "Speaker B" (crosshatch shading) and "background noise" (stippled shading). Notably, "Speaker B" is different from "Speaker A".

At block 408, the system generates a mixed instance of audio data that combines the ground truth instance of audio data and the additional instance of audio data. For example, mixed audio data 506 of FIG. 5 is generated by combining ground truth audio data 502 and additional audio data 504. Accordingly, mixed audio data 506 includes the shaded areas from ground truth audio data 502 (diagonal shading) and the shaded areas from additional audio data 504 (crosshatch shading and stippled shading). Accordingly, in mixed audio data 506, both "Speaker A" and "Speaker B" utterance are included, as well as "background noise". Further, parts of "Speaker A" utterances overlap with parts of the "background noise" and with part of "Speaker B" utterances.

At block 410, the system generates and stores a training instance that includes: the mixed instance of audio data, the speaker embedding, and the ground truth instance of audio data. For example, the system can generate and store a training instance that includes: mixed instance of audio data 506, the ground truth instance of audio data 502, and a speaker embedding generated using the ground truth instance of audio data 502.

At block 412, the system determines whether to generate an additional training instance using the same ground truth instance of audio data and the same speaker embedding, but a different mixed instance of audio data that is based on another additional instance. If so, the system proceeds back to block 406 and selects a different additional instance, proceeds to block 408 and generates another mixed instance of audio data that combines the same ground truth instance of audio data and the different additional instance, then proceeds to block 410 and generates and stores a corresponding training instance.

If, if at an iteration of block 412, the system determines not to generate an additional training instance using the same ground truth instance of audio data and the same speaker embedding, the system proceeds to block 414 and determines whether to generate an additional training instance using another ground truth instance of training data. If so, the system performs another iteration of blocks 402, 404, 406, 408, 410, and 412 utilizing a different ground truth instance of audio data with a different human speaker, utilizing a different speaker embedding, and optionally utilizing a different additional instance of audio data.

If, at an iteration of block 414, the system determines not to generate an additional training instance using another ground truth instance of audio data, the system proceeds to block 416 and generating of training instances ends.

Figure 6:
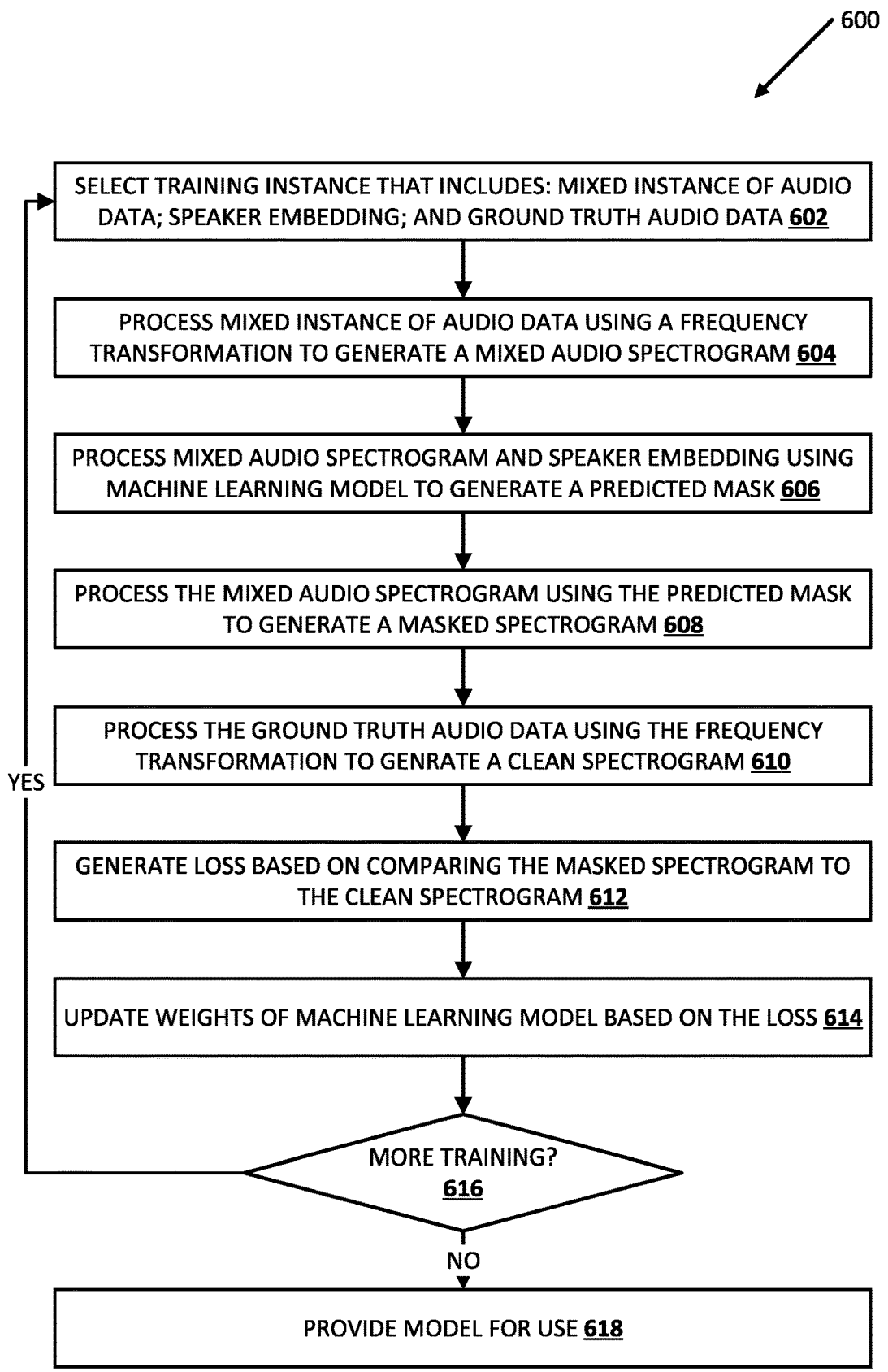
FIG. 6 is a flowchart illustrating an example process of training a voice filter model according to various implementations disclosed herein.

Turning now to FIG. 6, an example process 600 is illustrated of training a voice filter model according to various implementations disclosed herein. For convenience, the operations of the flowchart are described with reference to a system that performs the operations. This system may include various components of various computer systems, such as refinement engine 112 and/or one or more GPU(s), CPU(s), and/or TPU(s). Moreover, while operations of process 600 are shown in a particular order, this is not meant to be limiting. One or more operations may be reordered, omitted, and/or added.

At block 602, the system selects a training instance that includes a mixed instance of audio data, a speaker embedding, and ground truth audio data. For example, the system can select a training instance generated according to process 400 of FIG. 4.

At block 604, the system processes the mixed instance of audio data using a frequency transformation to generate a mixed audio spectrogram. In a variety of implementations, the frequency transformation can be a Fourier transform.

At block 606, the system processes the mixed audio spectrogram and the speaker embedding using a machine learning model (e.g., voice filter model 122) to generate a predicted mask.

At block 608, the system processes the mixed audio spectrogram using the predicted mask to generate a masked spectrogram. In many implementations, predicted mask is convolved with the mixed audio spectrogram to generate the masked spectrogram. In various implementations, the predicted mask isolates frequency representations of utterance(s) of the human speaker in the frequency representation of the mixed audio data.

At block 610, the system processes the ground truth audio data to generate a clean spectrogram. For example, the ground truth audio data can be processed using the frequency transformation (e.g., the Fourier transform) to generate a spectrogram from the ground truth audio data.

At block 612, the system generates a loss based on comparing the masked spectrogram to the clean spectrogram.

At block 614, the system updates one or more weights of the machine learning model based on the generated loss (i.e., backpropagation).

At block 616, the system determines whether to perform more training of the machine learning model. If so, the system proceeds back to block 602, selects an additional training instance, then performs an iteration of blocks 604, 606, 608, 610, 612, and 614 based on the additional training instance, and then performs an additional iteration of block 616. In some implementations, the system can determine to perform more if there are one or more additional unprocessed training instances and/or if other criterion/criteria are not yet satisfied. The other criterion/criteria can include, for example, whether a threshold number of epochs have occurred and/or a threshold duration of training has occurred. Although process 600 is described with respect to a non-batch learning technique, batch learning may additional and/or alternatively be utilized.

If, at an iteration of block 616, the system determines not to perform more training, the system can proceed to block 618 where the system considers the machine learning model trained, and provides the machine learning model for use. For example, the system can provide the trained machine learning model for use in process 700 (FIG. 7) as described herein.

Figure 7:
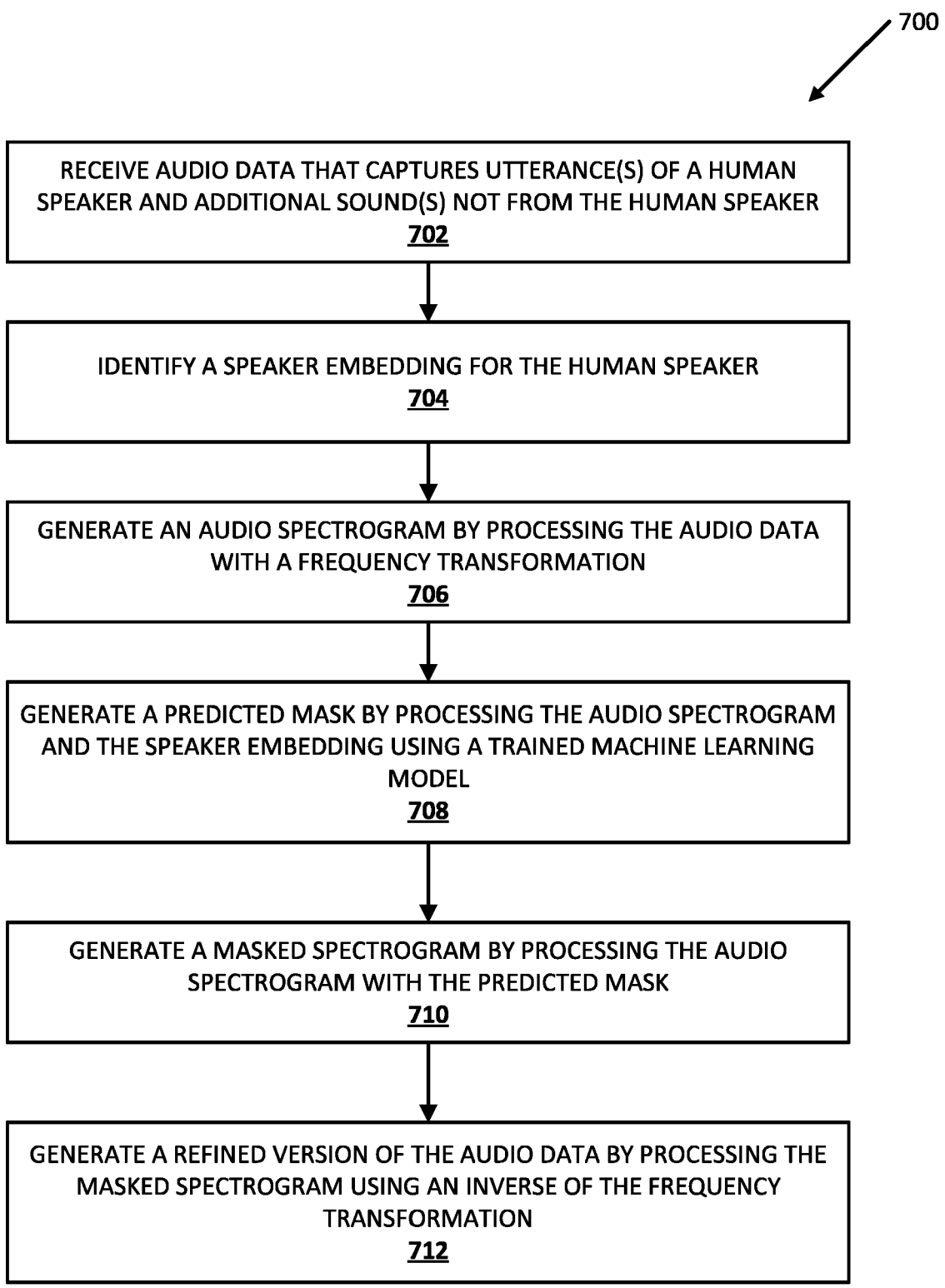
FIG. 7 is a flowchart illustrating an example process of generating refined version of audio data using the audio data, speaker embeddings, and a voice filter model, according to various implementations disclosed herein.
Figure 8:
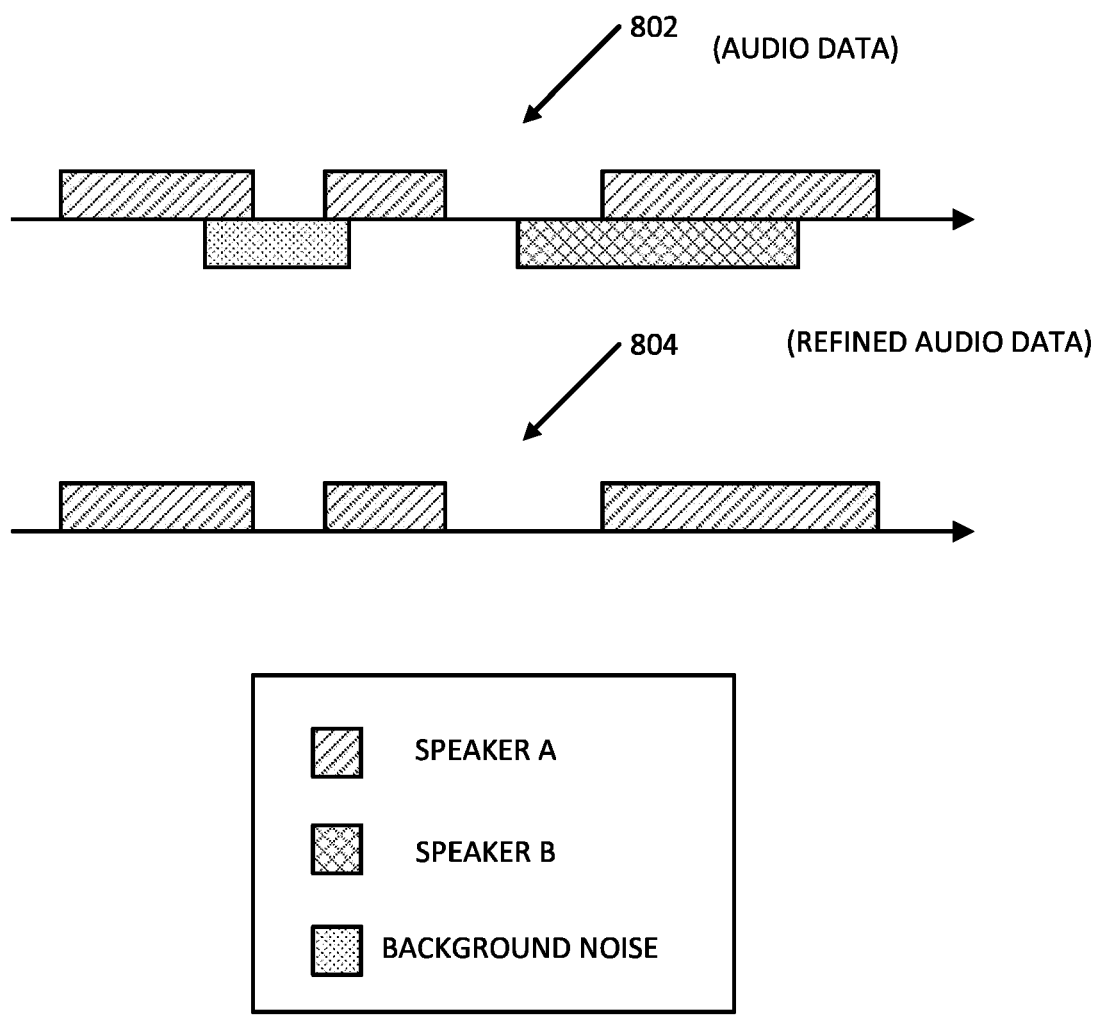
FIG. 8 illustrates an example of audio data and a refined version of the audio data that can be generated according to various implementations disclosed herein.

Turning now to FIG. 7, a process 700 of generating refined audio data using the audio data, a speaker embedding, and a voice filter model, according to various implementations disclosed herein. For convenience, the operations of certain aspects of the flowchart of FIG. 7 are described with reference to audio data 802 and refined audio data 804 that are schematically represented in FIG. 8. Also, for convenience, the operations of the flowchart of FIG. 7 are described with reference to a system that performs the operations. This system may include various components of various computer systems, such as speaker embedding engine 114, refinement engine 112, and/or one or more GPU(s), CPU(s), and/or TPU(s). In various implementations, one or more blocks of FIG. 7 may be performed by a client device using a speaker embedding model and a machine learning model stored locally at the client device. Moreover, while operations of process 700 are shown in a particular order, this is not meant to be limiting. One or more operations may be reordered, omitted, and/or added.

At block 702, the system receives audio data that captures utterance(s) of a human speaker and additional sound(s) that are not from the human speaker. In some implementations, the audio data is streaming audio data. As one example, at block 702 the system can receive the audio data 802 of FIG. 8, which includes utterances from "Speaker A" (diagonal shading), as well as utterances from "Speaker B" (stippled shading) and "background noise" (crosshatch shading).

At block 704, the system identifies a previously generated speaker embedding for the human speaker. For example, the system can select a previously generated speaker embedding for "Speaker A". For instance, the speaker embedding could have been previously generated based on an immediately preceding utterance from "Speaker A" that was received at the client device that generated the audio data—and can be selected based on "Speaker A" being the speaker of the immediately preceding utterance. Also, for instance, the speaker embedding could have been previously generated during an enrollment process performed by "Speaker A" for an automated assistant, client device, and/or other digital system. In such an instance, the speaker embedding can be selected based on the audio data being generated by the client device and/or via an account of "Speaker A" for the digital system. As one particular instance, audio data received at block 702 can be determined to be from "Speaker A" based on "Speaker A" being recently verified as an active user for the digital system. For example, voice fingerprinting, image recognition, a passcode, and/or other verification may have been utilized to determine "Speaker A" is currently active and, as a result, the speaker embedding for "Speaker A" can be selected.

At block 706, the system generates an audio spectrogram by processing the audio data with a frequency transformation. In a variety of implementations, the frequency transformation can be a Fourier transform.

At block 708, the system can generate a predicted mask by processing the audio spectrogram and the speaker embedding using a trained machine learning model. In many implementations, the trained machine learning model can be a trained voice filter model. Additionally or alternatively, the machine learning model can be trained in accordance with process 600 of FIG. 6 as described herein.

At block 710, the system can generate a masked spectrogram by processing the audio spectrogram with the predicted mask. For example, the audio spectrogram can be convolved with the predicted mask to generate the masked spectrogram.

At block 712, the system can generate a refined version of the audio data by processing the masked spectrogram using an inverse of the frequency transformation. For example, the system can generated the refined audio data 804 schematically illustrated in FIG. 8, in which only utterances of "Speaker A" remain. In many implementations, when the frequency transformation is a Fourier transform, the inverse frequency transformation can be an inverse Fourier transform.

The system can optionally determine (not pictured), based on the refined audio data generated at block 712, whether the audio data includes spoken input from the human speaker corresponding to the speaker embedding of block 704. For example, if the refined audio data is null/zero (e.g., all audio data is less than a threshold level), then the system can determine the audio data does not include any spoken input from the human speaker corresponding to the speaker embedding. On the other hand, if the refined audio data includes one or more non-null segments (e.g., exceeding a threshold level), the system can determine the audio data does include spoken input from the human speaker corresponding to the speaker embedding.

Figure 9:
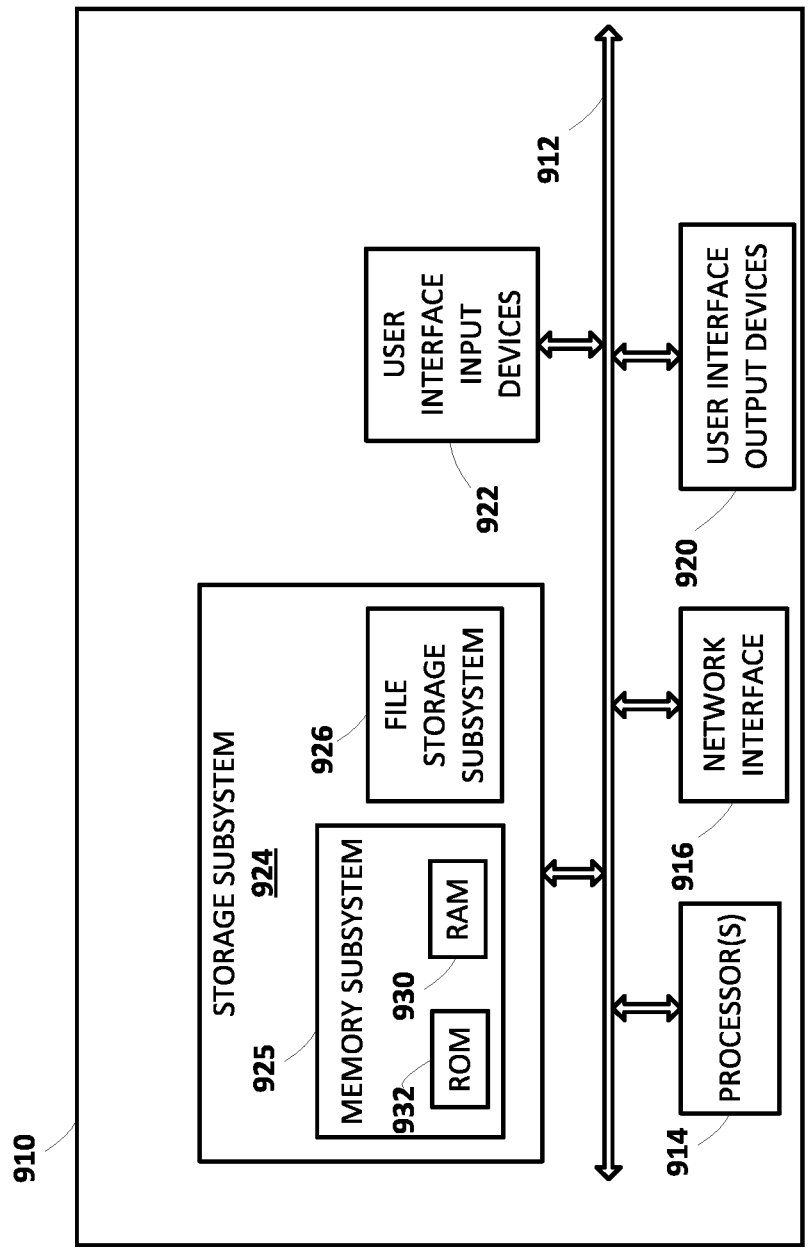
FIG. 9 illustrates an example architecture of a computing device.

FIG. 9 is a block diagram of an example computing device 910 that may optionally be utilized to perform one or more aspects of techniques described herein. In some implementations, one or more of a client computing device, and/or other component(s) may comprise one or more components of the example computing device 910.

Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of one or more of the processes of FIG. 4, FIG. 6, and/or FIG. 7, as well as to implement various components depicted in FIG. 1.

These software modules are generally executed by processor 914 alone or in combination with other processors. Memory 925 used in the storage subsystem 924 can include a number of memories including a main random access memory ("RAM") 930 for storage of instructions and data during program execution and a read only memory ("ROM") 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided that includes generating a speaker embedding for a human speaker. Generating the speaker embedding for the human speaker includes processing one or more instances of speaker audio data corresponding to the human speaker using a trained speaker embedding model, and generating the speaker embedding based on one or more instances of output each generated based on processing a respective of the one or more instances of speaker audio data using the trained speaker embedding model. The method further includes receiving audio data that captures one or more utterances of the human speaker and that also captures one or more additional sounds that are not from the human speaker. The method further includes generating a refined version of the audio data, wherein the refined version of the audio data isolates the one or more utterances of the human speaker from the one or more additional sounds that are not from the human speaker. Generating the refined version of the audio data includes processing the audio data using a frequency transformation to generate an audio spectrogram, wherein the audio spectrogram is a frequency domain representation of the audio data. The method further includes processing the audio spectrogram and the speaker embedding using a trained voice filter model to generate a predicted mask, wherein the predicted mask isolates the one or more utterances of the human speaker from the one or more additional sounds in the audio spectrogram. The method further includes generating a masked spectrogram by processing the audio spectrogram using the predicted mask, wherein the masked spectrogram captures the one or more utterances of the human speaker and not the one or more additional sounds. The method further includes generating the refined version of the audio data by processing the masked spectrogram using an inverse of the frequency transformation.

These and other implementations of the technology disclosed herein can include one or more of the following features.

In some implementations, the trained voice filter model includes a convolutional neural network portion, a recurrent neural network portion, and a fully connected feed-forward neural network portion. In some implementations, the method further includes processing the audio spectrogram and the speaker embedding using a trained voice filter model to generate a predicted mask includes processing the audio spectrogram using the convolutional neural network portion of the trained voice filter model to generate convolutional output. In some implementations, the method further includes processing the speaker embedding and the convolutional output using the recurrent neural network portion of the trained voice filter model to generate recurrent output. In some implementations, the method further includes processing the recurrent output using the fully connected feed-forward neural network portion of the trained voice filter model to generate the predicted mask.

In some implementations, the method further includes processing the refined version of the audio data using the trained speaker embedding model to generate refined output. In some implementations, the method further includes determining whether the human speaker spoke the refined version of the audio data by comparing the refined output with the speaker embedding for the human speaker. In some versions of those implementations, in response to determining the human speaker spoke the refined version of the audio data, the method further includes performing one or more actions that are based on the refined version of the audio data. In some versions of those implementations, performing one or more actions that are based on the refined version of the audio data includes generating responsive content that is customized for the human speaker and that is based on the refined version of the audio data. In some implementations, the method further includes causing a client device to render output based on the responsive content. In some versions of those implementations, in response to determining the human speaker did not speak the refined version of the audio data, the method further includes performing one or more actions that are based on the audio data. In some versions of those implementations, performing one or more actions that are based on the refined version of the audio data includes generating responsive based on the refined version of the audio data. In some implementations, the method further includes causing a client device to render output based on the responsive content.

In some implementations, the frequency transformation is a Fourier transform, and the inverse of the frequency transformation is an inverse Fourier transform.

In some implementations, the trained speaker embedding model is a recurrent neural network model.

In some implementations, generating a masked spectrogram by processing the audio spectrogram using the predicted mask includes convolving the predicted mask with the audio spectrogram to generate the masked spectrogram.

In some implementations, the one or more additional sounds of the audio data that are not from the human speaker captures one or more utterances of an additional human speaker that is not the human speaker, and the method further includes generating an additional speaker embedding for the additional human speaker, wherein generating the additional speaker embedding includes processing one or more instances of additional speaker audio data corresponding to the additional speaker using the trained speaker embedding model, and generating the additional speaker embedding based on one or more instances of additional output each generated based on processing a respective of the one or more instances of additional speaker audio data using the trained speaker embedding model. In some implementations, the method further includes generating an additional refined version of the audio data, wherein the additional refined version of the audio data isolates the one or more utterances of the additional speaker from the one or more utterances of the human speaker and from the one or more additional sounds that are not from the additional speaker, and wherein generating the refined version of the audio data includes processing the audio spectrogram and the additional speaker embedding using the trained voice filter model to generate an additional predicted mask, wherein the additional predicted mask isolates the one or more utterances of the additional human speaker from the one or more utterances of the human speaker and the one or more additional sounds in the audio spectrogram. In some implementations, the method further includes generating an additional masked spectrogram by processing the audio spectrogram using the additional predicted mask, wherein the additional masked spectrogram captures the one or more utterances of the human speaker and not the one or more utterances of the human speaker and not the one or more additional sounds. In some implementations, the method further includes generating the additional refined version of the audio data by processing the additional masked spectrogram using the inverse of the frequency transformation.

In some implementations, the audio data is captured via one or more microphones of a client device and wherein generating the speaker embedding for the human speaker occurs after at least part of the audio data is captured via the one or more microphones of the client device. In some versions of those implementations, the one or more instances of the speaker audio data used in generating the speaker embedding comprise an instance that is based on the audio data, and the method further includes identifying the instance based on the instance being from an initial occurrence of voice activity detection in the audio data.

In some implementations, the sequence of audio data is captured via one or more microphones of a client device, and wherein generating the speaker embedding for the human for the human speaker occurs prior to the sequence of audio data being captured via the one or more microphones of the client device. In some versions of those implementations, the speaker audio data processed is generating the speaker embedding comprises one or more enrollment utterances spoken by the human speaker during enrollment with a digital system. In some versions of those implementations, the speaker embedding is stored locally at the client device during the enrollment with the digital system, and wherein the speaker embedding is used in generating the refined version of the sequence of audio data based on the sequence of audio data being captured via the client device. In some versions of those implementations, an additional embedding, for an additional human speaker, is stored locally at the client device during an additional enrollment of the additional human speaker with the digital system, and the method further includes selecting the embedding, in lieu of the additional embedding, based on sensor data captured at the client device indicating that the human speaker is currently interfacing with the client device. In some versions of those implementations, the sensor data is additional audio data that precedes the sequence of audio data, wherein the additional audio data is an invocation phrase for invoking the digital system, and wherein the additional audio data indicates that the human speaker is currently interfacing with the client device based on the additional audio data corresponding to the human speaker.

In some implementations, a method of training a machine learning model to generate refined versions of audio data that isolate any utterances of a target human speaker is provided, the method implemented by one or more processors and including identifying an instance of audio data that includes spoken input from only a first human speaker. The method further includes generating a speaker embedding for the first human speaker. The method further includes identifying an additional instance of audio data that lacks any spoken input from the first human speaker, and that includes spoken input from at least one additional human speaker. The method further includes generating a mixed instance of audio data that combines the instance of audio data and the additional instance of audio data. The method further includes processing the mixed instance of audio data and the speaker embedding using the machine learning model by processing the mixed instance of audio data using a frequency transformation to generate a mixed audio spectrogram, wherein the mixed audio spectrogram is a frequency domain representation of the mixed audio data. The method further includes processing the mixed audio data spectrogram using a convolutional neural network portion of the machine learning model to generate convolutional output. The method further includes processing the convolutional output and the speaker embedding using a recurrent neural network portion of the machine learning model to generate recurrent output. The method further includes processing the recurrent output using a fully connected feed-forward neural network portion of the machine learning model to generate a predicted mask. The method further includes processing the mixed audio spectrogram using the predicted mask to generate a masked spectrogram. The method further includes processing the instance of audio data that includes spoken input only from the first human speaker using the frequency transformation to generate an audio spectrogram. The method further includes generating a loss based on comparison of the predicted audio spectrogram and the masked spectrogram. The method further includes updating one or more weights of the machine learning model based on the loss.

In some implementations, a method implemented by one or more processors is provided, the method including invoking an automated assistant client at a client device, wherein invoking the automated assistant client is in response to detecting one or more invocation queries in received user interface input. In response to invoking the automated assistant client, the method further includes performing certain processing of initial spoken input received via one or more microphones of the client device. The method further includes generating a responsive action based on the certain processing of the initial spoke input. The method further includes causing performance of the responsive action. The method further includes determining that a continued listening mode is activated for the automated assistant client device. In response to the continued listening mode being activated, the method further includes automatically monitoring for additional spoken input after causing performance of at least part of the responsive action. The method further includes receiving audio data during the automatically monitoring. The method further includes determining whether the audio data includes any additional spoken input that is from the same human speaker that provided the initial spoken input, wherein determining whether the audio data includes the additional spoken input that is from the same human speaker includes identifying a speaker embedding for the human speaker that provided the spoken input. The method further includes generating a refined version of the audio data that isolates any of the audio data that is from the human speaker, wherein generating the refined version of the audio data includes processing the audio data using a frequency transformation to generate an audio spectrogram, wherein the audio spectrogram is a frequency domain representation of the audio data. The method further includes processing the audio spectrogram and the speaker embedding using a trained voice filter model to generate a predicted mask. The method further includes generating a masked spectrogram by processing the audio spectrogram using the predicted mask, wherein the masked spectrogram captures any of the audio data that is from the human speaker. The method further includes generating the refined version of the audio data by processing the masked spectrogram using an inverse of the frequency transformation. The method further includes determining whether the audio data includes the any additional spoken input that is from the same human based on whether any portions of the refined version of the audio data correspond to at least a threshold level of audio.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

What is claimed is:

1. A client device comprising:
one or more processors, and
memory configured to store instructions that, when executed by the one or more processors, cause the one or more processors to perform a method that includes:
    invoking an automated assistant client at the client device, wherein invoking the automated assistant client is in response to detecting one or more instances of invocation user interface input;
    in response to invoking the automated assistant client:
        capturing one or more instances of spoken input via one or more microphones of the client device;
        performing certain processing of the one or more instances of spoken input;
        generating a responsive action based on the certain processing of the one or more instances of spoken input;
        causing performance of the responsive action;
        determining that a continued listening mode is activated for the automated assistant client device;
        in response to the continued listening mode being activated:
            automatically monitoring for additional spoken input including after causing performance of at least part of the responsive action;
            receiving audio data during the automatically monitoring;
            determining whether the audio data includes any additional spoken input that is from a same human speaker who provided the spoken input, wherein determining whether the audio data includes the additional spoken input that is from the same human speaker comprises:
                identifying a speaker embedding for the human speaker that provided the one or more instances of spoken input, wherein the speaker embedding was generated based on one or more respective instances of speaker audio data corresponding to the human speaker;
                generating a refined version of the audio data, based on the speaker embedding and the one or more instances of spoken input, that isolates any of the audio data that is from the human speaker; and
                determining, based on the refined audio data, whether the audio data includes any additional spoken input that is from the same human.

2. The client device of claim 1, wherein the one or more instances of invocation of the user interface input is a selection of a graphical user interface element of the client device.

3. The client device of claim 1, wherein determining, based on the refined audio data, whether the audio data includes any additional spoken input that is from the same human comprises:
    processing the refined version of the audio data to determine whether the refined version of the audio data includes one or more non-null segments; and
    in response to determining the refined version of the audio data includes one or more non-null segments, determining the refined audio data includes any additional spoken input that is from the same human.

4. The client device of claim 3, in response to determining the audio data includes any additional spoken input that is from the same human speaker that provided the spoken input and further comprising:
    performing one or more additional actions that are based on the refined version of the audio data.

5. The client device of claim 4, wherein performing the one or more additional actions that are based on the refined version of the audio data comprises:
    generating additional responsive content that is customized for the human speaker and that is based on the refined version of the audio data; and
    causing the client device to render output based on the additional responsive content.

6. The client device of claim 1, wherein determining, based on the refined audio data, whether the audio data includes any additional spoken input that is from the same human comprises:
    processing the refined version of the audio data to determine whether the refined version of the audio data includes one or more non-null segments; and
    in response to determining the refined version of the audio data does not include one or more non-null segments, determining the audio data does not include any additional spoken input that is from the same human.

7. The client device of claim 6, in response to determining the audio data does not include any additional spoken input that is from the same human that provided the spoken input and further comprising:
    performing one or more additional actions that are based on the audio data capturing additional spoken input.

8. The client device of claim 7, wherein performing one or more additional actions that are based on the audio data capturing the additional spoken input comprises:
    generating additional responsive content that is not customized for the human speaker; and
    causing the client device to render output based on the additional responsive content.

9. A method implemented by one or more processors, the method comprising:
    invoking an automated assistant client at a client device, wherein invoking the automated assistant client is in response to detecting one or more instances of invocation user interface input;
    in response to invoking the automated assistant client:
        capturing one or more instances of spoken input via one or more microphones of the client device;
        performing certain processing of the one or more instances of spoken input;
        generating a responsive action based on the certain processing of the one or more instances of spoken input;
        causing performance of the responsive action;
        determining that a continued listening mode is activated for the automated assistant client device;

in response to the continued listening mode being activated:
            automatically monitoring for additional spoken input including after causing performance of at least part of the responsive action;
            receiving audio data during the automatically monitoring;
            determining whether the audio data includes any additional spoken input that is from a same human speaker who provided the spoken input, wherein determining whether the audio data includes the additional spoken input that is from the same human speaker comprises:
                identifying a speaker embedding for the human speaker that provided the one or more instances of spoken input, wherein the speaker embedding was generated based on one or more respective instances of speaker audio data corresponding to the human speaker;
                generating a refined version of the audio data, based on the speaker embedding and the one or more instances of spoken input, that isolates any of the audio data that is from the human speaker; and
                determining, based on the refined audio data, whether the audio data includes any additional spoken input that is from the same human.

10. The method of claim 9, wherein the one or more instances of invocation of the user interface input is a selection of a graphical user interface element of the client device.

11. The method of claim 9, wherein determining, based on the refined audio data, whether the audio data includes any additional spoken input that is from the same human comprises:
    processing the refined version of the audio data to determine whether the refined version of the audio data includes one or more non-null segments; and
    in response to determining the refined version of the audio data includes one or more non-null segments, determining the refined audio data includes any additional spoken input that is from the same human.

12. The method of claim 11, in response to determining the audio data includes any additional spoken input that is from the same human speaker that provided the spoken input and further comprising:
    performing one or more additional actions that are based on the refined version of the audio data.

13. The method of claim 12, wherein performing the one or more additional actions that are based on the refined version of the audio data comprises:
    generating additional responsive content that is customized for the human speaker and that is based on the refined version of the audio data; and
    causing the client device to render output based on the additional responsive content.

14. The method of claim 9, wherein determining, based on the refined audio data, whether the audio data includes any additional spoken input that is from the same human comprises:
    processing the refined version of the audio data to determine whether the refined version of the audio data includes one or more non-null segments; and
    in response to determining the refined version of the audio data does not include one or more non-null segments, determining the audio data does not include any additional spoken input that is from the same human.

15. The method of claim 14, in response to determining the audio data does not include any additional spoken input that is from the same human that provided the spoken input and further comprising:
    performing one or more additional actions that are based on the audio data capturing additional spoken input.

16. The method of claim 15, wherein performing one or more additional actions that are based on the audio data capturing the additional spoken input comprises:
    generating additional responsive content that is not customized for the human speaker; and
    causing the client device to render output based on the additional responsive content.

17. A non-transitory computer-readable storage medium storing instructions executable by one or more processors of a client device to perform a method of:
    invoking an automated assistant client at the client device, wherein invoking the automated assistant client is in response to detecting one or more instances of invocation user interface input;
    in response to invoking the automated assistant client:
        capturing one or more instances of spoken input via one or more microphones of the client device;
        performing certain processing of the one or more instances of spoken input;
        generating a responsive action based on the certain processing of the one or more instances of spoken input;
        causing performance of the responsive action;
        determining that a continued listening mode is activated for the automated assistant client device;
        in response to the continued listening mode being activated:
            automatically monitoring for additional spoken input including after causing performance of at least part of the responsive action;
            receiving audio data during the automatically monitoring;
            determining whether the audio data includes any additional spoken input that is from a same human speaker who provided the spoken input, wherein determining whether the audio data includes the additional spoken input that is from the same human speaker comprises:
                identifying a speaker embedding for the human speaker that provided the one or more instances of spoken input, wherein the speaker embedding was generated based on one or more respective instances of speaker audio data corresponding to the human speaker;
                generating a refined version of the audio data, based on the speaker embedding and the one or more instances of spoken input, that isolates any of the audio data that is from the human speaker; and
                determining, based on the refined audio data, whether the audio data includes any additional spoken input that is from the same human.

18. The non-transitory computer-readable storage medium of claim 17, wherein the one or more instances of invocation of the user interface input is a selection of a graphical user interface element of the client device.

19. The non-transitory computer-readable storage medium of claim 17, wherein determining, based on the refined audio data, whether the audio data includes any additional spoken input that is from the same human comprises:

processing the refined version of the audio data to determine whether the refined version of the audio data includes one or more non-null segments; and in response to determining the refined version of the audio data includes one or more non-null segments, determining the refined audio data includes any additional spoken input that is from the same human.

20. The non-transitory computer-readable storage medium of claim 19, in response to determining the audio data includes any additional spoken input that is from the same human speaker that provided the spoken input and further comprising:

performing one or more additional actions that are based on the refined version of the audio data.

* * * * *